(12) United States Patent
Kane et al.

(10) Patent No.: US 7,682,082 B2
(45) Date of Patent: Mar. 23, 2010

(54) COMPACT SURFACE SELF-COMPENSATED HYDROSTATIC BEARINGS

(75) Inventors: Nathan R. Kane, Somerville, MA (US); Joachim Sihler, Cheltenham (GB); Alexander H. Slocum, Concord, NH (US); Mark Walter, Keene, NH (US)

(73) Assignee: AMETEK-Precitech, Inc., Keene, NH (US)

( * ) Notice: Subject to any disclaimer, the term of this patent is extended or adjusted under 35 U.S.C. 154(b) by 446 days.

(21) Appl. No.: 11/818,017

(22) Filed: Jun. 13, 2007

(65) Prior Publication Data

US 2007/0286537 A1    Dec. 13, 2007

Related U.S. Application Data

(60) Provisional application No. 60/813,084, filed on Jun. 13, 2006.

(51) Int. Cl.
*F16C 32/06* (2006.01)
*F16C 29/00* (2006.01)

(52) U.S. Cl. ........................................ 384/110; 384/12
(58) Field of Classification Search ................. 384/100, 384/107, 110, 12
See application file for complete search history.

(56) References Cited

U.S. PATENT DOCUMENTS

| | | | |
|---|---|---|---|
| 2,449,297 A | 9/1948 | Hoffer | |
| 3,305,282 A | 2/1967 | Arneson | |
| 3,391,965 A * | 7/1968 | Lindeboom | 384/110 |
| 3,472,565 A | 10/1969 | Arneson | |
| 3,754,799 A | 8/1973 | Hedberg | |
| 4,978,233 A * | 12/1990 | Stotzel et al. | 384/12 |
| 5,104,237 A | 4/1992 | Slocum | |
| 5,397,184 A * | 3/1995 | Murai | 384/110 |
| 5,484,208 A | 1/1996 | Kane et al. | |
| 5,618,115 A * | 4/1997 | Yates | 384/110 |
| 5,700,092 A | 12/1997 | Wasson et al. | |
| 5,971,614 A | 10/1999 | Kane et al. | |
| 6,439,773 B1 * | 8/2002 | Fujikawa et al. | 384/100 |

OTHER PUBLICATIONS

Slocum, A. H., "Precision Machine Design", Prentice Hall, Eaglewood Cliffs, NJ 1992, pp. 551-579.

(Continued)

*Primary Examiner*—Thomas R Hannon
(74) *Attorney, Agent, or Firm*—RatnerPrestia

(57) ABSTRACT

A compact surface self-compensated hydrostatic bearing includes a rotor assembly including a rotor plate having upper and lower fluid restricting faces, a rotor top and bottom, each having bearing surfaces angled with respect to an axis of rotation of the rotor assembly; a stator assembly including a stator top and a stator bottom housing the rotor assembly therebetween, the stator top and bottom having bearing surfaces facing and spaced apart from the rotor top and bottom bearing surfaces forming upper and lower bearing gaps, respectively, therebetween; the stator top and bottom including a lower and an upper fluid restricting surface, respectively, facing and spaced apart from the rotor upper and rotor lower fluid restricting faces, respectively, forming upper and lower restricting gaps, respectively, therebetween; and a fluid supply system configured to supply pressurized fluid to the bearing gaps and into the upper and lower fluid restricting gaps.

35 Claims, 8 Drawing Sheets

OTHER PUBLICATIONS

Velednitski, V.M., et al. "Static Load Characteristics of a Hydrostatic Radial Bearing Without Draining Grooves and with Opposed Acting Restrictors", Machines and Tooling, vol. 51, No. 10, 1980, pp. 8-11.

Slocum, A.H., et al. "Design of Self Compensated Water-Hydrostatic Bearings", Precision Engineering, vol. 17, No. 3, 1995, pp. 173-185.

Kotilainen, M., et al. "Manufacturing of Cast Monolithic Hydrostatic Journal Bearings", Journal of the International Societies for Precision Engineering and Nanotechnology, vol. 25, 2001, pp. 235-244.

Kane, N.R., et al. "A hydrostatic rotary bearing with angled surface self-compensation", Precision Engineering, vol. 27, Issue 2, Apr. 2003, pp. 125-139.

* cited by examiner

COMPACT SURFACE SELF-COMPENSATED HYDROSTATIC BEARINGS

This application claims priority to U.S. Provisional Patent Application Ser. No. 60/813,084 filed Jun. 13, 2006, incorporated herein by reference.

FIELD OF THE INVENTION

The invention relates to hydrostatic bearings systems. More specifically, the invention relates to compact surface self-compensated hydrostatic bearing systems for use in, for example, precision machine tools.

BACKGROUND OF THE INVENTION

In order to exhibit static stiffness, hydrostatic bearings must regulate flow into the bearing pockets with a restrictor, feedback system, or the like. This enables the bearing to counteract externally applied loads by varying the fluid pressure in individual bearing pockets. Many hydrostatic bearings in machine tool applications use fixed resistance restrictors, such as orifices or capillaries, whose resistances are nominally equal to the flow resistance out of the bearing pocket. However, in order to achieve accuracy, the restrictors' flow resistance must all be equal or of a specific ratio. Also, because, capillary resistance, for example, varies with the fourth power of the diameter, tuning all the restrictors can be time consuming. Further, because one restrictor is required for each bearing pocket, including as many bearing pockets as possible in order to enhance averaging and improve accuracy greatly increases cost. Thus, rolling element bearings are often used whenever possible in machine tools.

Hydrostatic bearings' advantages and disadvantages were recognized early, and in the 1940's self-compensating bearing systems were developed using an opposed gap as a means to regulate flow to bearing pockets located on opposite sides of the bearing. In the 1960's, bearings were introduced that employed an atypical aerostatic bearing design that achieved compensation by including grooves of a precise depth on the surface of a shaft, which acted as flow restrictors. This form of regulating the flow on the surface also eliminated the need for separate restrictors. However, in such configurations, since the grooves act as restrictors, they must be machined or etched to a very precise depth and width that is matched to the radial clearance. One example of an aerostatic bearing design is the BlockHead™ aerostatic spindle developed by Professional Instruments Corp.

In contrast to aerostatic bearings, however, hydrostatic bearings offer substantially greater load capacity than aerostatic bearings. Conventional self-compensation methods for hydrostatic bearings were thus refined and incorporated into many different types of precision grinding machines developed primarily for machines used for grinding bearing rings. Self-compensation bearings were also developed that were used mainly for precision grinding and diamond turning machines. Other refinements of self-compensation were also developed, but required either cross-drilled holes or external plumbing to route the fluid from the compensating structures on one side of the bearing to the pockets on the other side. Alternatively, elastically deforming elements were also used to tune the compensation, but these designs add complexity and cost.

Conventional self-compensated bearings, which are less prone to clogging and have fewer parts, are desirable because their primary advantage is that their stiffness is not adversely affected by bearing gaps that are smaller or larger than intended; however, their stiffness is still finite and generally lower than ball or roller bearings. As a result, servostatic bearings were developed, where the fluid flow to the pockets was actively regulated by measurement of bearing gaps and the use of servo valves to achieve "infinite" stiffness. On the other hand, the rest of the machine structure is not infinitely stiff, and a valve on every pocket can become very expensive very quickly. Thus, this attempt to improve self-compensated bearings is also not without its drawbacks.

Moreover, the previous self-compensation designs required cross-drilling or the use of external fluid lines to connect the compensator to the opposed pad. Other designs evolved this general principle to create, for example, a thrust bearing where the compensation for the thrust lands came from features on the shaft radius. This was a forerunner of the present design; however, these designs still required the groove depths to be carefully tuned to the radial clearance. Ultimately, the first true surface self-compensating bearing was created where the compensating features are located opposite the pockets, so compensation is gap independent and the compensating features are then connected to the pockets via channels on the surface of the bearing. A high speed flow theory for this design concept was developed, and showed that it was robust enough that it could even be cast, including all the pockets and compensation features. Furthermore, surface self-compensation designs evolved to create a modular profile rail hydrostatic bearing. These designs, however, still do not lend themselves to low profile rotary tables, and hence angular surface self-compensated rotary bearings were initially developed. In this configuration, the assembly of elements used was evolved from the modular profile rail hydrostatic bearing, including the vertical orientation of the restrictor element; however, a simpler more accurate design still is needed in order to make the system mass-producible.

SUMMARY OF THE INVENTION

Accordingly, the present invention provides a surface self compensated hydrostatic bearing for use in precision machine tools, having, in combination, a rotor assembly, a stator assembly attached to a machine bed, a fluid pressure source and distribution system to supply pressurized fluid to keep the rotor assembly from making physical contact with the stator assembly.

In a first aspect, the invention provides a self-compensated hydrostatic bearing system comprising a rotor assembly including a rotor plate having an upper fluid restricting face and a lower fluid restricting face, and a rotor top and a rotor bottom having bearing surfaces angled with respect to an axis of rotation of the rotor assembly. Also included is a stator assembly including a stator top and a stator bottom attached to one another and housing at least a portion of the rotor assembly therebetween, the stator top having a bearing surface facing and spaced apart from the rotor top bearing surface forming upper bearing gaps therebetween, and the stator bottom having a bearing surface facing and spaced apart from the rotor bottom bearing surface forming lower bearing gaps therebetween. The stator top further includes a lower fluid restricting surface facing and spaced apart from the rotor upper fluid restricting face forming upper restricting gaps therebetween, and the stator bottom further includes an upper fluid restricting surface facing and spaced apart from the rotor lower fluid restricting face forming lower restricting gaps therebetween. The system further includes a fluid supply system configured to supply pressurized fluid to the upper and lower bearing gaps and into the upper and lower fluid restricting gaps.

In a second aspect, the invention provides a linear self-compensated hydrostatic bearing system. The system includes a rail assembly including a rail top and a rail bottom having bearing surfaces angled with respect to an axis of rotation of the rotor assembly; a carriage bearing assembly including a carriage bearing plate having an upper fluid restricting face and a lower fluid restricting face, a carriage bearing top and a carriage bearing bottom attached to one another and housing at least a portion of he rail assembly therebetween, the carriage bearing top having a bearing surface facing and spaced apart from the rotor top bearing surface forming upper bearing gaps therebetween; and the carriage bearing bottom having a bearing surface facing and spaced apart from the rail bottom bearing surface forming lower bearing gaps therebetween. The carriage bearing top further includes a lower fluid restricting surface facing and spaced apart from the rail upper fluid restricting face forming upper restricting gaps therebetween. The carriage bearing bottom further includes an upper fluid restricting surface facing and spaced apart from the rail lower fluid restricting face forming lower restricting gaps therebetween. The system also includes a fluid supply system configured to supply pressurized fluid to the bearing gaps and into the upper and lower fluid restricting gaps.

In a third aspect, the invention provides a method for providing self-compensation in a hydrostatic bearing system comprising the step of introducing a pressurized fluid to a concentrically mated rotor assembly and stator assembly having flowpaths formed therebetween. The flowpaths include upper and lower bearing gaps formed between rotor top and bottom bearing surfaces which are angled with respect to an axis of rotation of the rotor assembly, and corresponding bearing surfaces of a stator top and stator bottom of the stator assembly. The flowpaths further include upper and lower restricting gaps formed between rotor upper and lower fluid restricting surfaces and corresponding stator top and bottom lower and upper restricting surfaces, respectively. In response to displacement of the rotor assembly from an original position relative to the stator assembly, the pressurized fluid flowing through the flowpaths imparts pressure feedback to restore the rotor assembly to substantially the original position.

BRIEF DESCRIPTION OF DRAWINGS

The present invention will now be described with reference to the accompanying drawing in which.

DETAILED DESCRIPTION OF THE INVENTION

Figure 1:
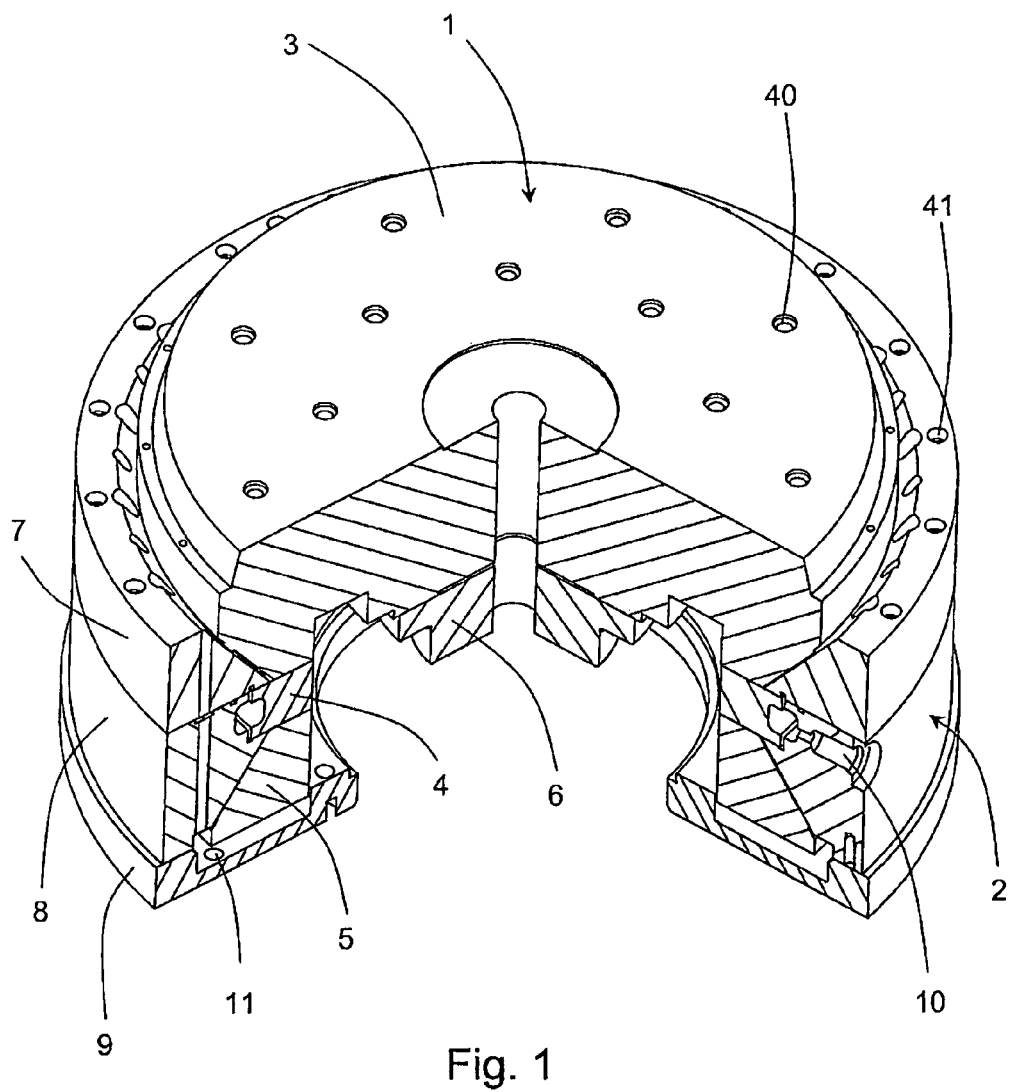
FIG. 1 is an isometric cut-away view of the rotary hydrostatic bearing of the present invention.

The present invention relates to a rotary hydrostatic bearing system for use in precision machine tools, having, in combination, a rotor assembly, a stator assembly attached to a machine bed, a fluid pressure source and distribution system to supply pressurized fluid to keep the rotor assembly from making physical contact with the stator assembly.

In the present invention, flow restriction, or compensation, between the pressure supply and the load supporting surfaces is provided by a geometry that is an integral part of the system formed onto components that make up the assembly. In particular, the geometry is especially well suited for use in spindles and rotary tables, but it can also be used for linear motion systems. The invention establishes the relative position of a rotor assembly to a stator assembly with the use of a novel arrangement of precision surfaces, which result in a highly rigid and stable hydrostatic bearing, particularly in axial and tilt modes of loading.

For a rotary bearing application, such as in a spindle or a rotary table, the system provides concentric mating parts that, when viewed as a cross section with the bearing axis oriented vertically, form horizontal restricting gaps that feed acutely angled bearing pockets and bearing lands. By orienting the lands at an acute angle relative to the restricting gaps, preferably in the range of 40 to 50 degrees, the effective hydrostatic feedback due to axial and tilt displacements will be greater than a system that uses fixed restrictors, such as capillaries or orifices. This is because an axial displacement, by virtue of its orientation, will cause both the restrictor gaps to open and the bearing gaps to close (or visa versa), thus roughly doubling the pocket pressure increase (or decrease) that occurs as compared to a fixed restrictor scenario. The present invention exploits this principle to provide a remarkably simple and rigid bearing assembly.

The rotor assembly includes a rotor plate, such as a disk, sandwiched between a rotor top and a rotor bottom where the rotor plate with flat and parallel upper and lower faces act as fluid flow restriction surfaces. The rotor top has a lower face which mates with a portion of the upper fluid restricting face of the rotor plate. A conical bearing surface forms an acute angle with the upper fluid restricting face of the rotor plate and the conical bearing surface of the rotor top. Hydrostatic bearing pockets are formed thereon. The rotor bottom has a configuration including essentially mirror image hydrostatic surfaces of the rotor top.

The stator assembly has a stator bottom having a conical surface which forms an acute angle with the rotor plate's upper fluid restricting face, and a second upper face which is parallel to and located at a height "H" above the rotor plate's upper fluid restricting face where "H" is slightly larger than the thickness of said rotor plate. The stator top has a configuration that is essentially a mirror image of the hydrostatic surfaces of the stator bottom. The stator assembly houses at least a portion of the rotor assembly between the stator top and stator bottom, for example as shown in the cross-sectional view of FIG. 4. Alternatively, the entire rotor assembly may be housed in the stator assembly.

The rotor assembly parts and stator assembly parts are sized and assembled concentrically so that small gaps, for example, on the order of about 3 micrometers to about 100 micrometers, suitable for hydrostatic bearing operation, are present between the fluid restricting faces and the conical bearing surfaces. Supply passages direct pressurized fluid to the fluid restricting gaps. The stator assembly also has internal passages and one or more drain holes to allow fluid to exit the bearing. As a result, the system includes a large diameter to height ratio, making it highly compact and rigid and, it is believed, more dynamically stable, while using a minimal number of parts and precision surfaces. Thus, manufacturing costs and complexity are minimized while achieving ultra low error motion with high structural and hydrostatic rigidity in all modes of deflection, particularly in tilt mode—often the critical mode of compliance in practical precision machining operations.

In addition, the system is less prone to clogging by virtue of fluid restricting surfaces that move relative to one another, as compared to bearings with static fluid restricting orifices or capillaries. The surface self compensation of the present invention may also be applied to linear motion systems, where the cross section profile of the rotary bearing is essentially extruded linearly to define a carriage assembly. The carriage assembly comprises a left hand side, a right hand side and a top plate, and a rail assembly comprising a left hand side and a right hand side which are mirror images of each other.

Figure 2:
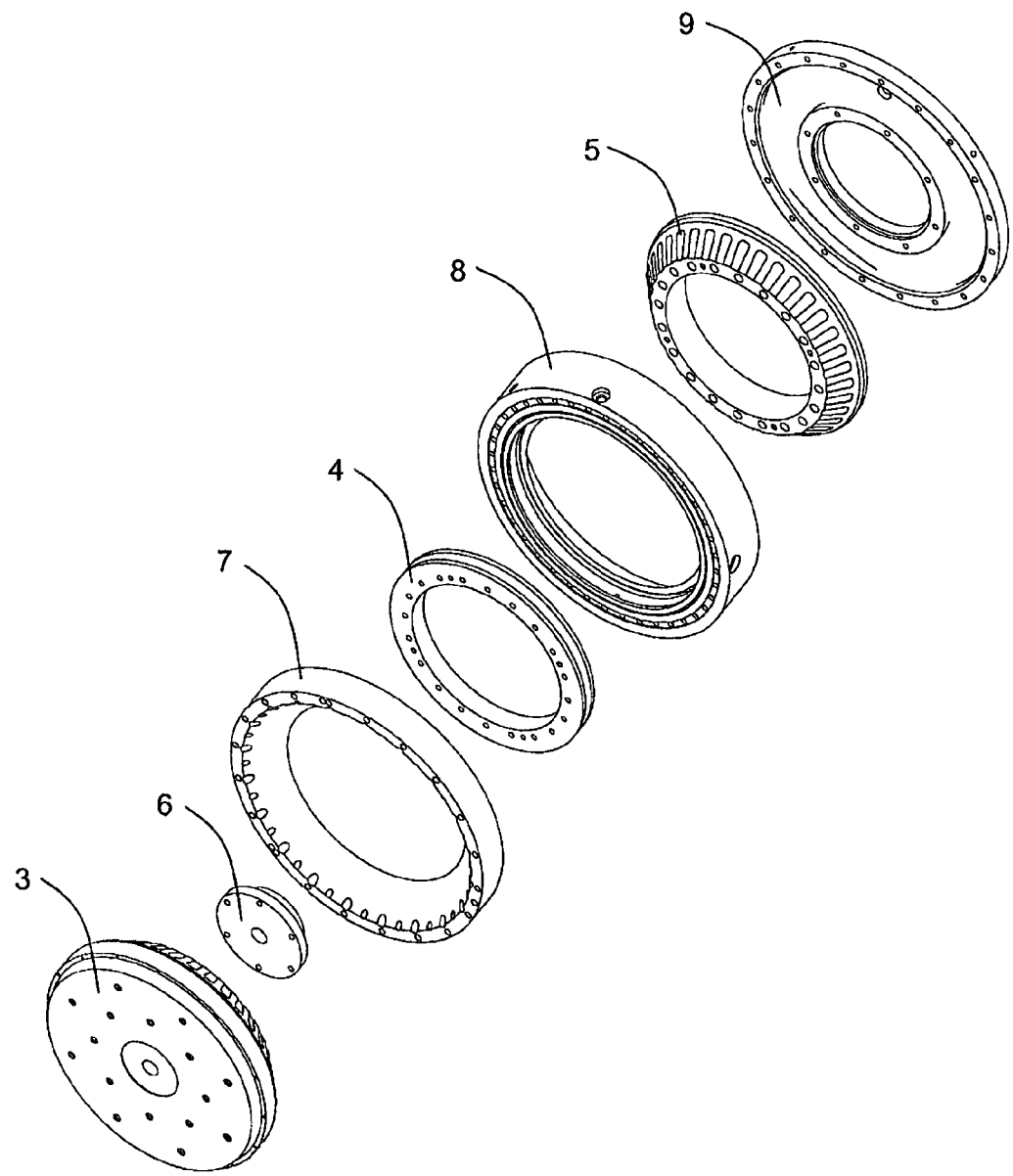
FIG. 2 is an exploded view of the rotary hydrostatic bearing of the present invention.

The present invention will now be discussed in further detail, with reference to the Figures. FIG. 1 is an isometric cut-away view of the hydrostatic bearing of the present invention. FIG. 2 illustrates an exploded view of the hydrostatic bearing according to the present invention. As shown in FIGS. 1 and 2, the invention includes rotor assembly 1 and a stator assembly 2. Rotor assembly 1 comprises rotor top 3, rotor plate 4, rotor bottom 5, and motor adaptor plate 6, all rigidly affixed to one another by bolts passing through bolt holes such as bolt hole 40. Stator assembly 2 comprises stator top 7, stator bottom 8, and stator base 9, all rigidly affixed to one another by bolts passing through bolt holes such as bolt hole 41. Pressurized fluid enters supply port 10 and drains at atmospheric pressure through drain hole 11.

Optionally, the invention further provides internal drainage passages where at least one can be switched from drainage to pressure to bias the pressure forces on the bearing which acts to lock the bearing in a fixed desired position.

Figure 3:
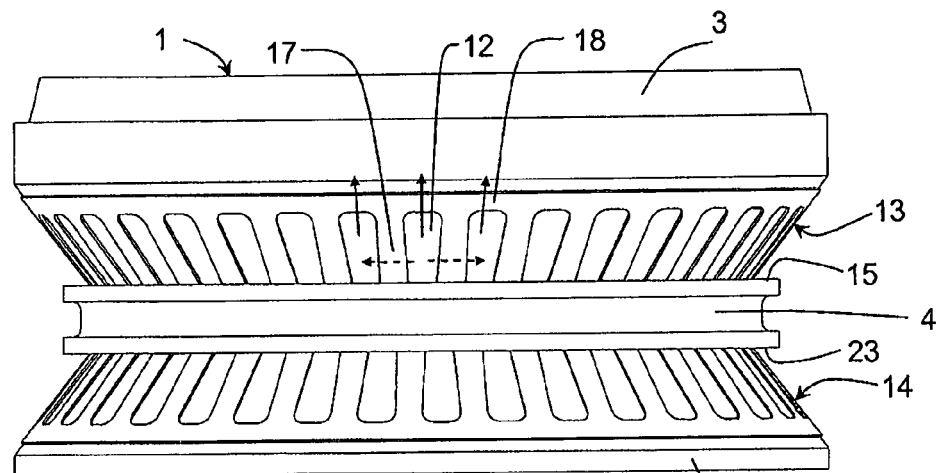
FIG. 3 is a side view of the rotor assembly of the present invention.

FIG. 3 shows a side view of rotor assembly 1, showing upper fluid restricting face 15 and lower fluid restricting face 23 on rotor plate 4, conical bearing surface 13 on rotor top 3, and conical bearing surface 14 on rotor bottom 5. Hydrostatic pockets such as pocket 12 are present on both conical bearing surfaces 13 and 14. Also present are bearing lands that restrict flow to the atmosphere such as bearing land 18, and leakage lands that restrict flow between pockets such as leakage land 17.

Figure 4:
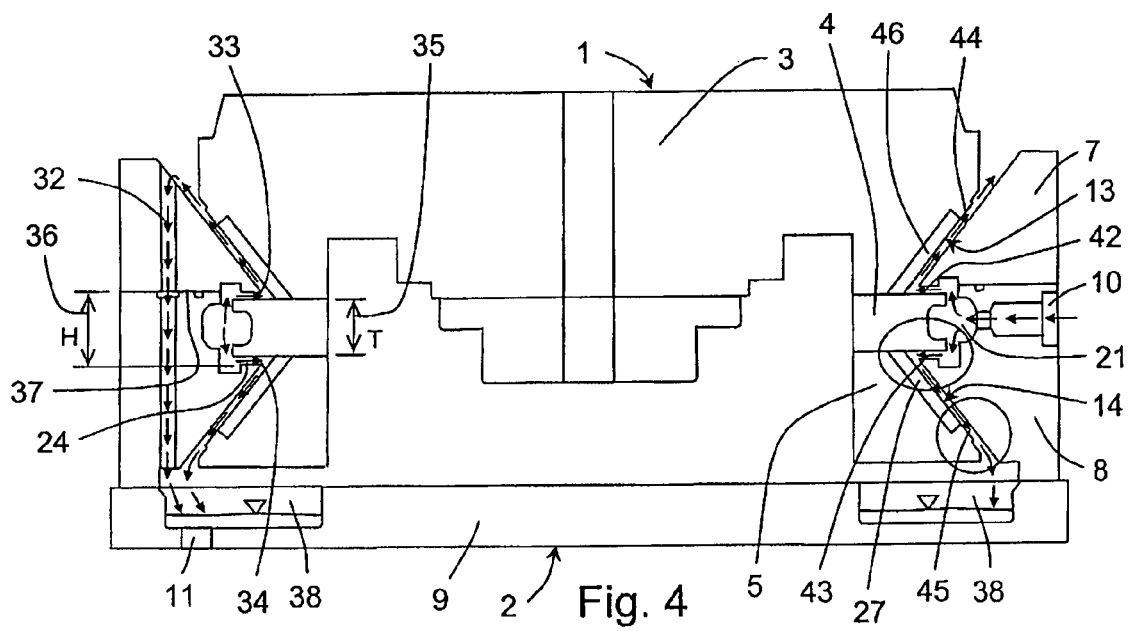
FIG. 4 is a cross section of the hydrostatic bearing of the present invention showing the flowpath of fluid through the bearing gaps.

FIG. 4 illustrates cross-sectional view of the fluid flowpath through the bearing of the present invention. For illustrative purposes, the gaps shown between stator assembly 2 and rotor assembly 1 are greatly exaggerated relative to the depth of the pockets. Pressurized fluid enters supply port 10 and fills supply channel 21, and then flows into upper restrictor gap 42 and lower restrictor gap 43. On the upper bearing half, fluid flows from restrictor gap 42 into the upper pockets, such as pocket 46, and then through bearing gap 44, where it exists at atmospheric pressure. The fluid then drains via gravity through internal passages such as passage 32, into trough 38, and then through drain hole 11. On the lower bearing half, after exiting restrictor gap 43, fluid flows into the lower pockets, such as pocket 27, then through bearing gap 45, where it exits at atmospheric pressure. Fluid then drains via gravity into drain trough 38 and then through drain hole 11.

Restrictor gaps 42 and 43 and bearing gaps 44 and 45, as shown in FIG. 4, are to be manufactured to be equal to one another, with a target gap ranging from 10 micrometers to 20 micrometers, and with a tolerance of typically plus or minus 1 micrometer. Depending on the design requirements however, the gap target can be as small as 3 micrometers for a small bearing (e.g. an outer diameter of about 50 mm or less) designed to use water or air as the fluid, or as large as 100 micrometers for a very large bearing (e.g. an outer diameter of 1000 mm or greater) designed to use a high viscosity hydraulic oil as the fluid. The corresponding gap tolerance would typically be on the order of one tenth to one fifth of the target bearing gap.

An advantage of the present design is the relative ease with which the restrictor gaps and bearing gaps can be increased or decreased so as to match each other within a desired tolerance. If, after manufacturing, restrictor gaps 42 and 43, and bearing gaps 44 and 45 are found to be out of tolerance, either rotor plate 4 can be re-ground to reduce rotor thickness 35, or face 37 on stator bottom 8 can be re-ground to reduce the height 36 from fluid restricting face 24 on stator bottom 8. When rotor plate 4 is re-ground, restrictor gaps 42 and 43 will increase and bearing gaps 44 and 45 will decrease. When face 37 of stator bottom 8 is re-ground, the opposite effect will result, i.e. restrictor gaps 42 and 43 will decrease and bearing gaps 44 and 45 will increase. By these means, the gaps can be adjusted and matched via relatively simple grinding operations.

In order to prevent shorting between adjacent pockets, sharp edge 33 on stator top 7 and sharp edge 34 on stator bottom 8 must be left sharp after grinding, and handled with care during assembly to prevent damage to them. Once the bearing is assembled, the sharp edges are protected, and no special handling precautions are needed. Alternatively, the sharp edges can be chamfered to a specific dimension, particularly if they are made of ceramic components.

Figure 5:
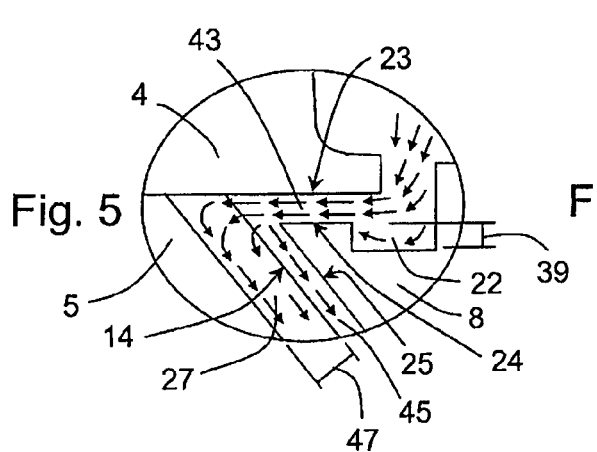
FIG. 5 is a close up view of a fluid restricting gap of the present invention.

FIG. 5 shows a close up view of the region around lower restrictor gap 43. For illustrative purposes, the size of restrictor gap 43 and bearing gap 45 are shown greatly exaggerated as compared to depth 39 of supply groove 22 and depth 47 of bearing pocket 27. In a practical bearing, depth 39 and depth 47 would be 10 times that of gaps 43 and 45, or deeper, to minimize the pressure drop in those features. As shown, restrictor gap 43 is bounded by lower fluid restricting face 23 on rotor plate 4, and by upper fluid restricting face 24 on stator bottom 8. Bearing gap 45 is bounded by conical bearing surface 14 on rotor bottom 5 and conical bearing surface 25 on stator bottom 8. Tracing the flowpath shown, fluid enters lower supply groove 22, flows through restrictor gap 43, and then flows into lower bearing pocket 27 located on conical bearing surface 14. Some fluid also flows in the leakage land regions between the pockets where bearing gap 45 is present.

Figure 6:
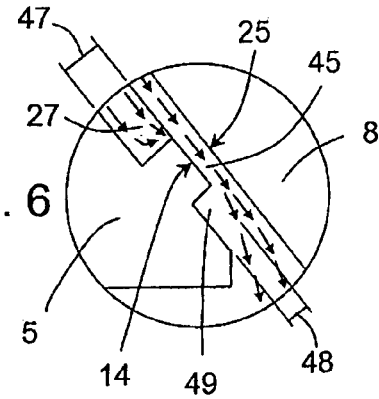
FIG. 6 is a close up view of a bearing gap of the present invention.

FIG. 6 shows a close up view of the region around lower bearing gap 45. For illustrative purposes, the size of bearing gap 45 is shown greatly exaggerated as compared to depth 47 of bearing pocket 27, and depth 48 of relief groove 49. In practice, depth 47 and depth 48 would be 10 times that of gaps 43 and 45, or deeper, to minimize the pressure drop in these areas. As shown, bearing gap 45 is bounded by conical bearing surface 14 on rotor bottom 5 and conical bearing surface 25 on stator bottom 8. Tracing the flowpath, fluid in bearing pocket 27 flows through bearing gap 45 and exhausts at nearly atmospheric pressure into relief groove 49.

Figure 7:
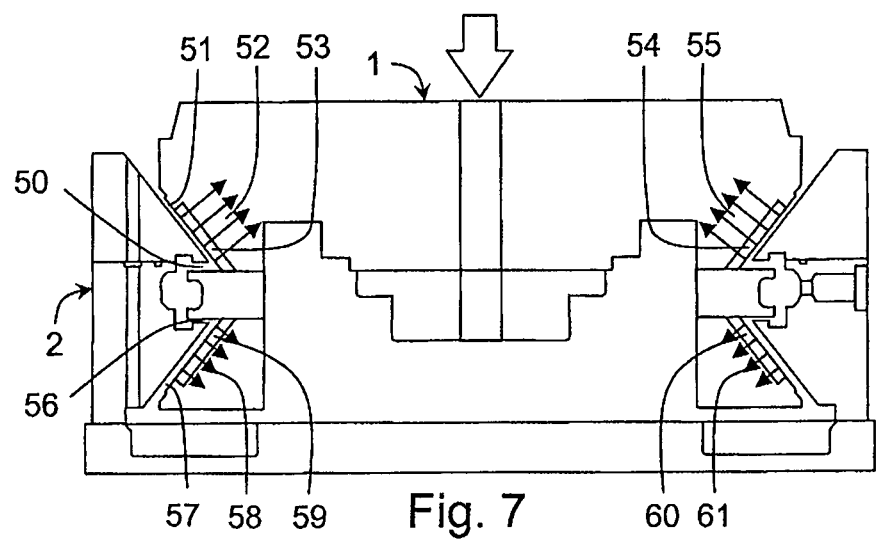
FIG. 7 is a cross section illustrating how pocket pressures respond to oppose an axial displacement of the rotor.
Figure 8:
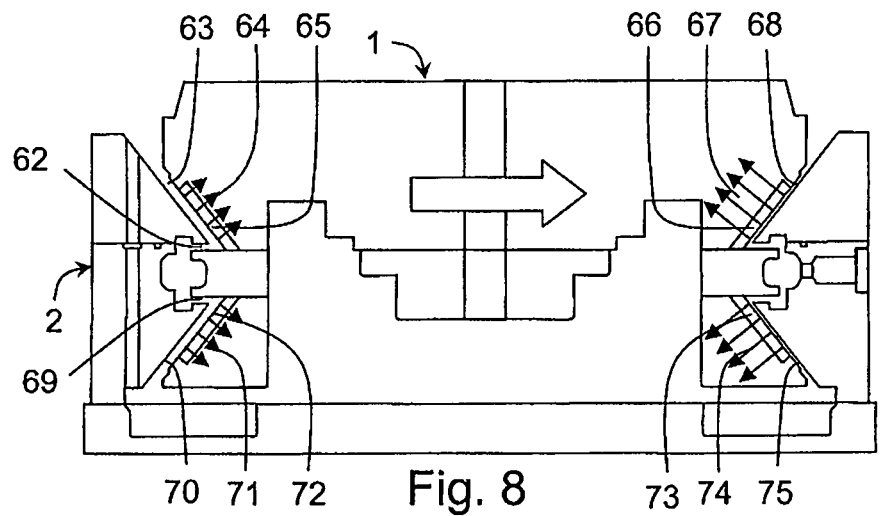
FIG. 8 is a cross section illustrating how pocket pressures respond to oppose a radial displacement of the rotor.
Figure 9:
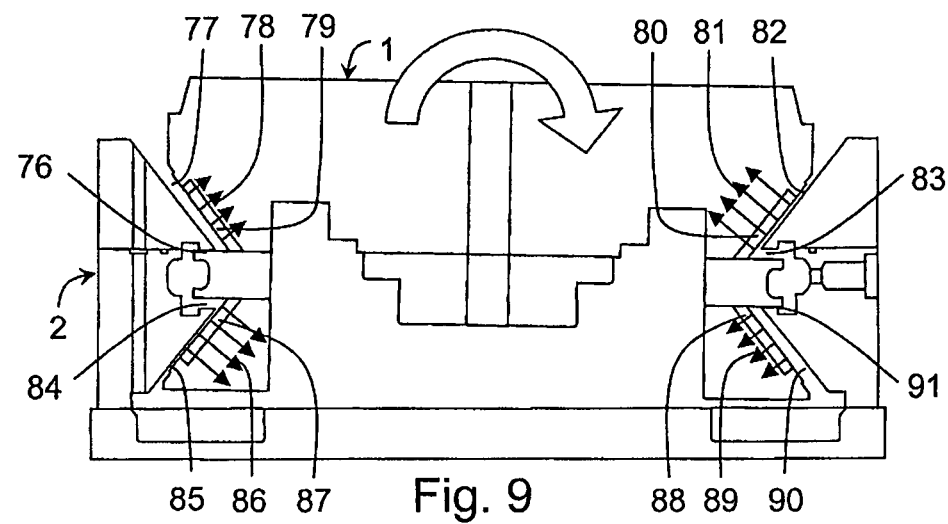
FIG. 9 is a cross section illustrating how pocket pressures respond to oppose a tilt displacement of the rotor.

FIG. 7 illustrates how the bearing pocket pressures respond to oppose an axial displacement of the bearing rotor. When rotor assembly 1 is displaced downward relative to stator assembly 2, upper restrictor gap 50 opens, and upper bearing gap 51 closes. These both act to cause pocket pressures 52 and 55 in upper pockets 53 and 54 to increase. When rotor assembly 1 is displaced downward, lower restrictor gap 56, conversely, closes, and lower bearing gap 57 opens. These both act to cause pocket pressures 58 and 61 in lower pockets 59 and 60 to decrease, as shown in FIGS. 7-9 by the lengths of the elongated arrows. Both of the described pressure changes result in a net upward force on rotor assembly 1, thus acting to restore it to its original undisplaced position.

For the axial mode of displacement, due to the fact that the restrictor gaps are modulated in addition to the bearing gaps, more pressure feedback occurs than would result from a conventional fixed restrictor bearing (which might include orifices or capillaries to provide the fluid restricting function). The factor of improvement in given axial displacement can be more than double, because the restrictor gaps are actually modulated at a faster rate than the bearing gaps.

FIG. 8 illustrates how the bearing pocket pressures respond to oppose a radial displacement of the bearing rotor. When rotor assembly 1 is displaced to the right relative to stator assembly 2, bearing gaps 68 and 75 on the right close, and bearing gaps 63 and 70 on the left open. These act to cause pocket pressures 67 and 74 to increase in pockets 66 and 73 on the right, and pocket pressures 64 and 71 to decrease in pockets 65 and 72 on the left, respectively. Both of the described pressure changes result in a net leftward force on rotor assembly 1, thus serving to restore it to its original undisplaced position. Restrictor gaps 62 and 69 remain constant during a radial displacement, and thus they do not contribute to hydrostatic stiffness in this case.

For the radial mode of displacement, due to the fact that the restrictor gaps remain constant, and only the bearing gaps are modulated, about the same pressure feedback occurs as would occur using conventional fixed restrictors feeding the bearing pockets on the conical bearing surfaces.

FIG. 9 illustrates how the bearing pocket pressures respond to oppose a tilt displacement of the bearing rotor. When rotor assembly 1 is tilted clockwise relative to stator assembly 2, restrictor gaps 83 and 84 open, and their corresponding bearing gaps 82 and 85 close. This causes pocket pressures 81 and 86 to increase. Conversely, restrictor gaps 91 and 76 close, and corresponding bearing gaps 90 and 77 open, thus causing pocket pressures 89 and 78 to decrease. All of the described pressure changes result in a net counterclockwise torque on rotor assembly 1, thus serving to restore it to its original undisplaced position.

Similar to the axial displacement case, for the tilt mode of displacement, due to the fact that the restrictor gaps are modulated in addition to the bearing gaps, more pressure feedback occurs than would result for a conventional fixed restrictor bearing (which may include orifices or capillaries to provide the fluid restricting function). The factor of improvement in this mode can be more than double, because the restrictor gaps are actually modulated at a faster rate than the bearing gaps.

Figure 10:
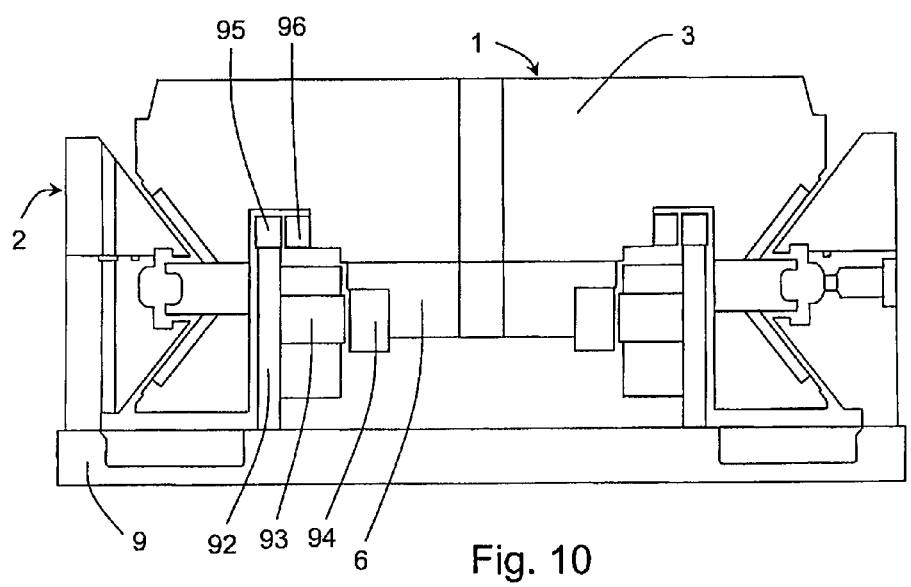
FIG. 10 is a cross section of the bearing of the present invention integrated with a brushless drive motor.

FIG. 10 illustrates a bearing of the present invention integrated with a brushless DC motor and a non-contact rotary encoder, enabling an entirely non-contact ultra-precision rotary table capable of closed loop control. Brushless motor stator 93 is mounted to motor mount 92, which is mounted to stator base 9. Brushless motor rotor 94 is mounted to adaptor plate 6 on rotor assembly 1. Encoder rotor 96 is mounted to rotor top 3, and encoder stator 95 is mounted to motor mount 92. Due to the lack of mechanical contact and the lack of wear and static friction associated with it, this configuration enables ultra precise sub micro-radian closed loop positioning control. Alternatively, a brushed motor could be used.

Figure 11:
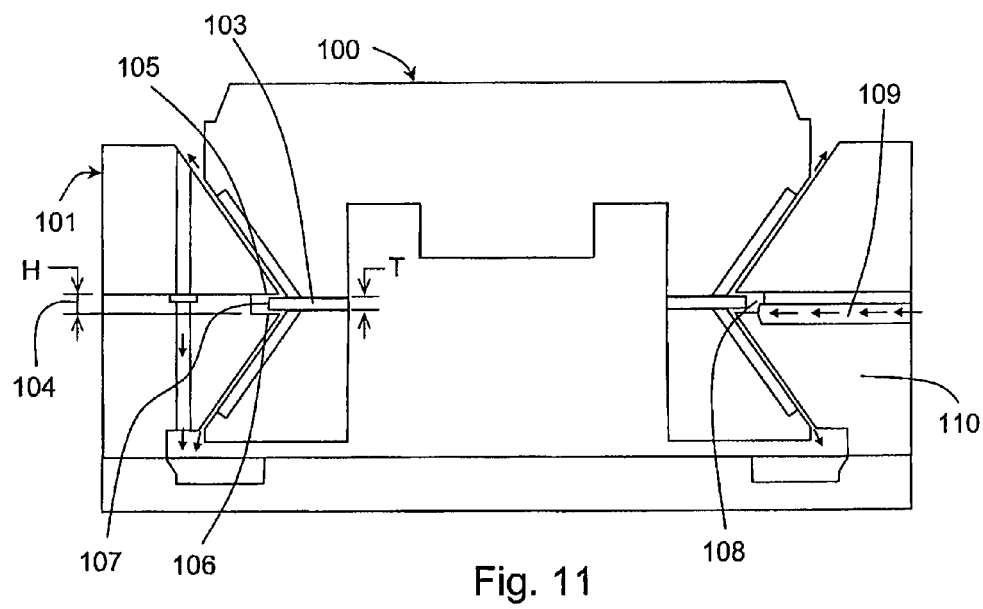
FIG. 11 is a cross section of a compact embodiment having a thinner rotor plate and no supply grooves or relief grooves.

FIG. 11 illustrates a more compact embodiment of the present invention, comprising a rotor assembly 100 with a thinner rotor plate 103, and a stator assembly 101 with a smaller height 104. Fluid restricting faces 105 and 106 do not have supply grooves, and rotor plate outer edge 107 does not have a concave channel therewithin. Supply passage 108 can be sized to provide minimal pressure drop as fluid flows circumferentially through it. To further minimize supply passage pressure variations, multiple supply ports such as port 109 can be provided around the perimeter of stator bottom 110.

Figure 12:
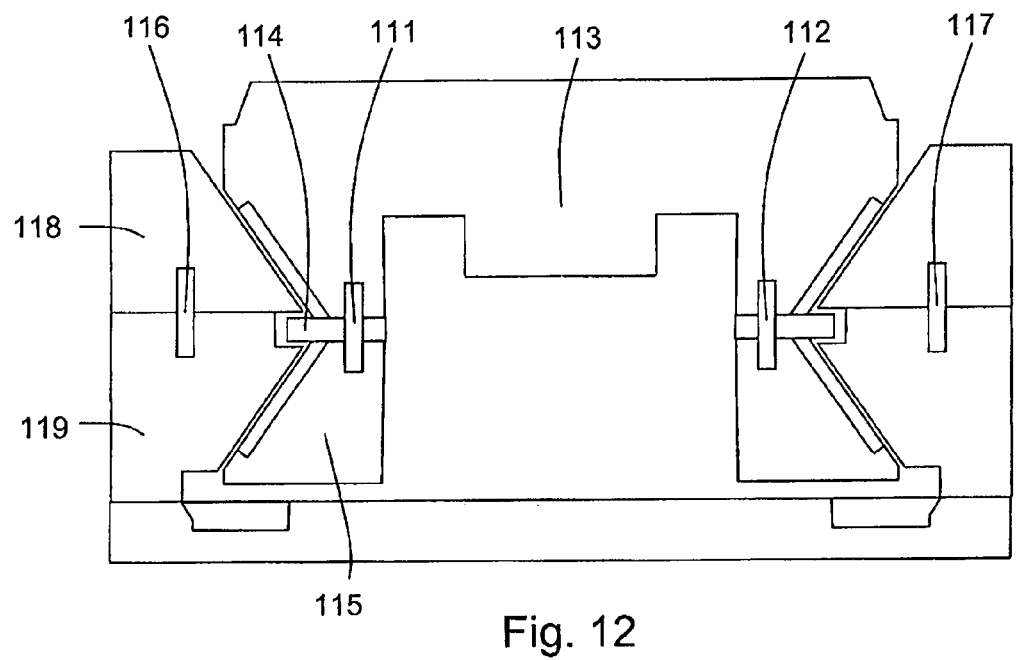
FIG. 12 is a cross section illustrating the use of alignment pins as a means of achieving precise alignment between mated rotor parts and mated stator parts.

FIG. 12 illustrates the use of alignment pins as a means of achieving precise alignment between mated rotor parts and mated stator parts. Precision alignment pins 111 and 112 pass through rotor top 113, rotor plate 114, and rotor bottom 115 to hold the parts in precise alignment with each other. Precision alignment pins 116 and 117 pass through stator top 118 and stator bottom 119 to hold the parts in precise alignment with each other as well.

Figure 13:
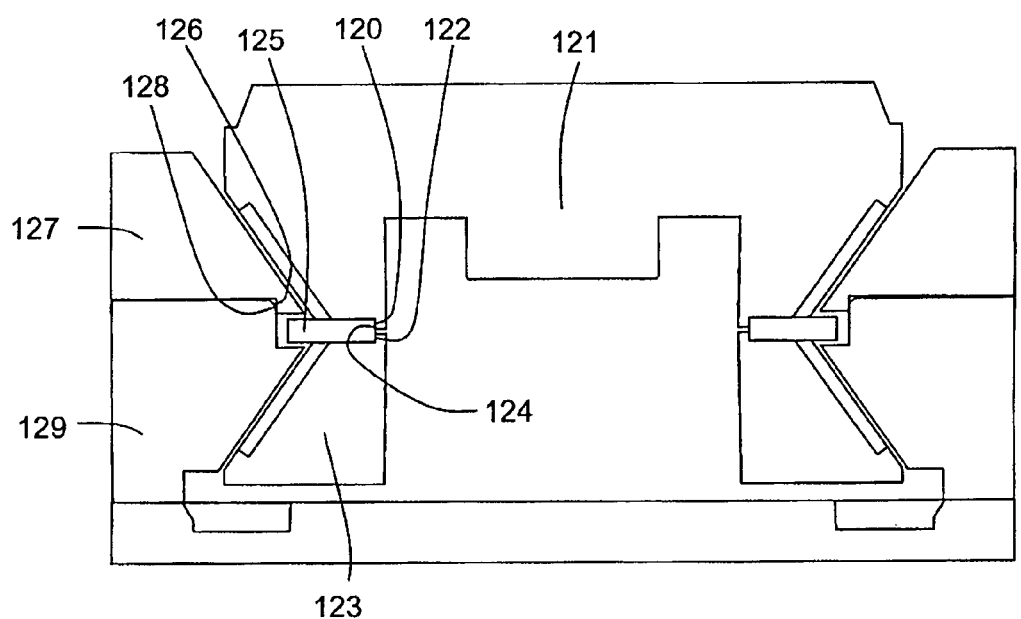
FIG. 13 is a cross section illustrating the use of shoulders as a means of achieving precise alignment between mated rotor parts and mated stator parts.

FIG. 13 illustrates the use of shoulders as a means of achieving precise alignment between mated rotor parts and mated stator parts. Interior shoulder 120 on rotor top 121, and interior shoulder 122 on rotor bottom 123 contact inner surface 124 on rotor plate 125, thus holding the three parts in alignment with each other. Interior shoulder 126 on stator top 127 contacts inner surface 128 on stator bottom 129, thus holding the two parts in alignment with each other.

Although the above preferred embodiments focused on rotary bearing applications, the invention can also be applied to a linear motion system, where essentially the diameters of the parts are infinite, i.e. in a segment of an infinite radius bearing, and the stator becomes two parts, a left hand part and a right hand part. In such configurations, for example, the cross section profile of the rotary bearing is essentially extruded linearly to define a carriage assembly comprising a left hand side, a right hand side, and a top plate, and a rail assembly comprising a left hand side and a right hand side which are mirror images of each other.

Figure 14:
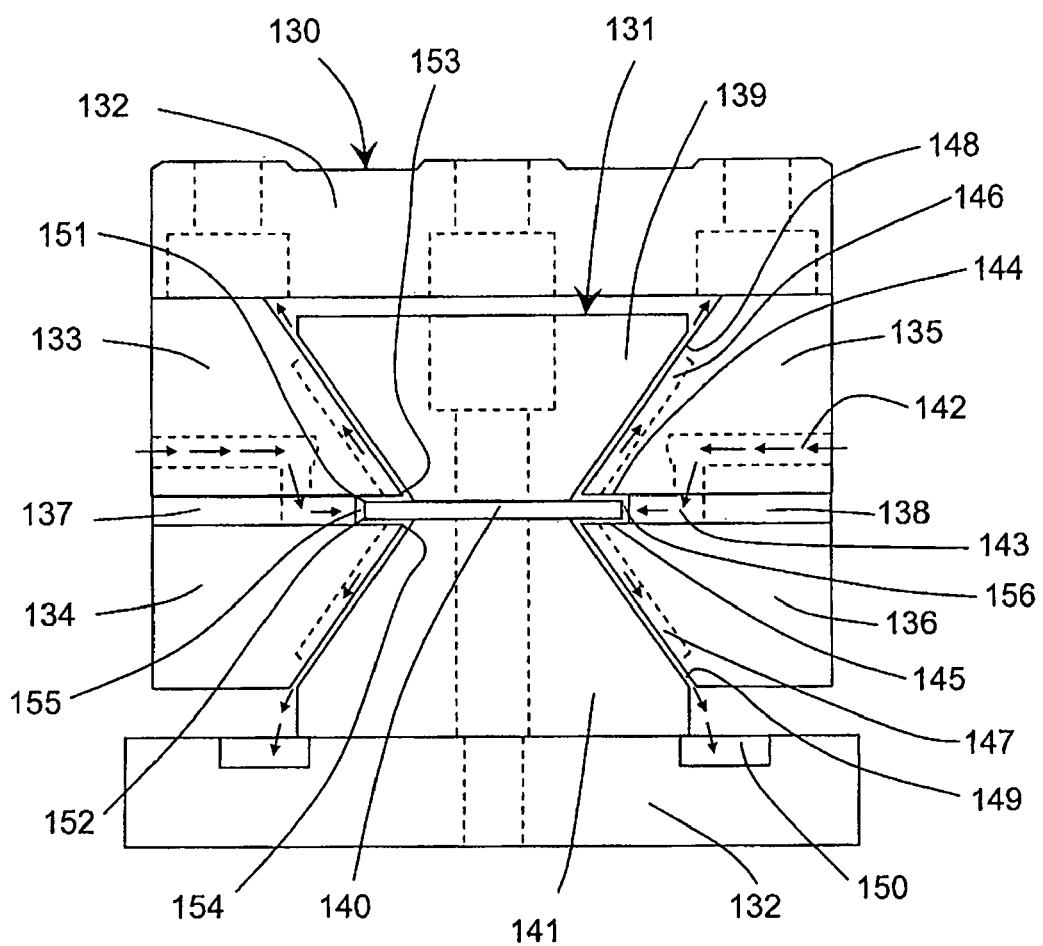
FIG. 14 is a cross section of the present invention applied to a compact linear bearing.

FIG. 14 illustrates the use of the surface self compensation of the present invention applied to a linear bearing. This configuration comprises a carriage assembly 130 and rail assembly 131 mounted to machine bed 132. Carriage assembly 130 comprises carriage top 132, carriage bearing parts 133, 134, 135 and 136, and carriage plates 137 and 138. Rail assembly 131 comprises rail top 139, rail plate 140, and rail bottom 141. Rail assembly 131 is shown bolted to machine bed 132. On the right side of carriage assembly 130, pressurized fluid enters supply port 142, flows into supply cavity 143, and enters fluid restricting gaps 144 and 145. Fluid then flows into pockets 146 and 147, and exits through bearing gaps 148 and 149 into the atmosphere. Fluid is then captured in drain channel 150 in machine bed 132. The left side of the bearing is a mirror image of the right, and essentially the same flowpath occurs on the left side. In addition to the flowpaths described, fluid can also flow out the ends of the bearing parallel to the rail. To maximize the resistance to fluid flow along endwise leakage paths, and hence minimize end leakage, edges such as 151, 152 on rail plate 140 must be left sharp after grinding, and edges such as 153 and 154 on bearing parts 133 and 134 must be left sharp as well after grinding. Leakage gaps 155 and 156 do not influence pocket pressure response, and hence their precision is less important. Leakage gaps 155 and 156 can be made larger than the restrictor gaps and bearing gaps to allow larger particles escape the supply cavities.

Figure 15:
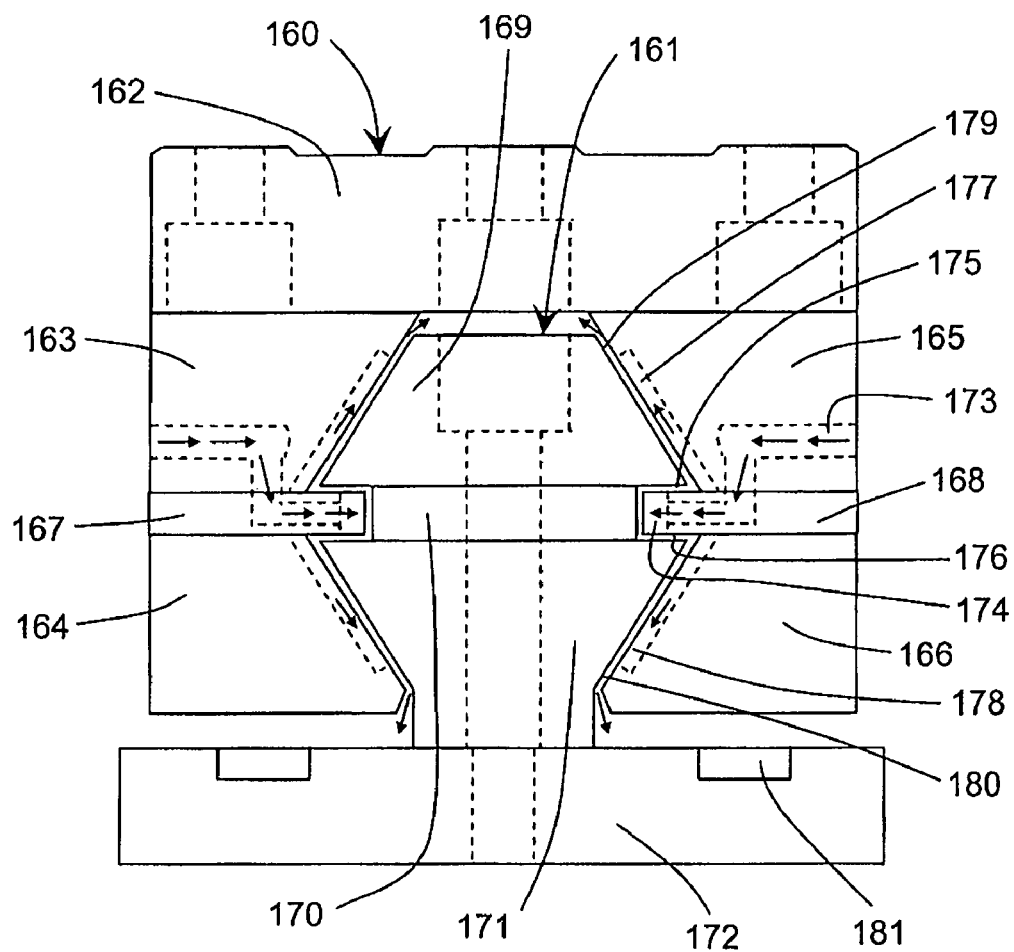
FIG. 15 is a cross section of the present invention applied to a linear bearing with a face-to-face bearing land configuration.

FIG. 15 illustrates a face to face embodiment of the linear bearing described in FIG. 14. Carriage assembly 160 comprises carriage top 162, carriage bearing parts 163, 164, 165 and 166, and carriage plates 167 and 168. Rail assembly 161 comprises rail top 169, rail plate 170, and rail bottom 171. Rail assembly 161 is shown bolted to machine bed 172. On the right side of carriage assembly 160, pressurized fluid enters supply port 173, flows into supply cavity 174, and enters fluid restricting gaps 175 and 176. Fluid then flows into pockets 177 and 178, and exits through bearing gaps 179 and ISO into the atmosphere. Fluid is then captured in drain channel 181 in machine bed 172. The left side of the bearing is a mirror image of the right, and essentially the same flow-path occurs on the left side.

In another embodiment of the present invention, the rotor plate can be made a part of the stator assembly, hence then it would be called the stator plate. This configuration can enable the stator assembly to be made monolithic, for example using a machine that allows one angled side to be precision machined, then the part turned over to precision machine the other side. The rotor can then be made from two parts that when bolted together sandwich the stator plate between them.

The self-compensating hydrostatic bearings of the present invention are designed to achieve a design that inherently allows a large diameter to height ratio, making it highly compact and rigid and potentially more dynamically stable, while using a minimal number of parts and precision surfaces. The design is intended to thus minimize manufacturing cost and complexity to achieve ultra low error motion with high structural and hydrostatic rigidity, particularly in tilt mode.

It is also contemplated that the present invention can be turned inside out. Such configurations, however, will be apparent to those skilled in the art of precision machine design.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A compact surface self-compensated hydrostatic bearing system comprising:
   a rotor assembly including a rotor plate having an upper fluid restricting face and a lower fluid restricting face, and a rotor top and a rotor bottom having bearing surfaces angled with respect to an axis of rotation of the rotor assembly;
   a stator assembly including a stator top and a stator bottom attached to one another and housing at least a portion of the rotor assembly therebetween, the stator top having a bearing surface facing and spaced apart from the rotor top bearing surface forming upper bearing gaps therebetween; and the stator bottom having a bearing surface facing and spaced apart from the rotor bottom bearing surface forming lower bearing gaps therebetween,
   the stator top further including a lower fluid restricting surface facing and spaced apart from the rotor upper fluid restricting face forming upper restricting gaps therebetween, and the stator bottom further including an upper fluid restricting surface facing and spaced apart from the rotor lower fluid restricting face forming lower restricting gaps therebetween; and
   a fluid supply system configured to supply pressurized fluid to the upper and lower bearing gaps and into the upper and lower fluid restricting gaps.

2. The system of claim 1 wherein the rotor plate upper and lower fluid restricting faces are each flat and parallel.

3. The system of claim 2 wherein the bearing surface of the stator bottom forms an angle with the upper fluid restricting face of the rotor plate and with a second upper face of the stator bottom which is parallel to the upper fluid restricting face of the rotor plate.

4. The system of claim 3 wherein the rotor bottom is a mirror image of the rotor top.

5. The system of claim 3 wherein the bearing surface of the stator top forms an angle with the lower fluid restricting face of the rotor plate and with a second lower face of the stator bottom which is parallel to the lower fluid restricting face of the rotor plate.

6. The system of claim 3 wherein the second upper surface of the upper stator is located a height "H" above the upper fluid restricting face the rotor plate.

7. The system of claim 6 wherein H is between 3 micrometers and 100 micrometers.

8. The system of claim 3 further comprising supply passages that direct the pressurized fluid to upper and lower restricting gaps between the fluid restricting surfaces, and drain passages with one or more drain holes to allow fluid to exit the bearing.

9. The system of claim 8 wherein the drain passages are internal drainage passages that are independent of one another.

10. The system of claim 9 further comprising a pressure actuated position rotor motion lock including a valve attached to a pressure source and a drain to one of the drainage passages.

11. The system of claim 1 wherein the bearing surfaces of the rotor top and bottom comprise conical bearing surfaces.

12. The system of claim 1 wherein the rotor top further comprises a lower face which mates with a portion of the upper fluid restricting surface of the rotor plate and the rotor top bearing surface to form an angle with the upper fluid restricting face of the rotor plate.

13. The system of claim 12 wherein the rotor bottom is a mirror image of the rotor top.

14. The system of claim 12 wherein the rotor bottom further comprises an upper face which mates with a portion of the lower fluid restricting surface of the rotor plate and the rotor bottom bearing surface to form an angle with the lower fluid restricting face of the rotor plate.

15. The system of claim 1 wherein the bearing surfaces of the rotor top and bottom comprise hydrostatic bearing pockets formed thereon.

16. The system of claim 15 wherein the perimeter of the hydrostatic bearing pockets are nominally U-shaped with the ends of the U intersecting gaps between the rotor plate upper fluid restriction surface and the stator top and between the rotor plate lower fluid restricting surface and the stator bottom, and the base of the U being rounded or flat.

17. The system of claim 16 wherein the U-shaped pockets are formed from a groove that traces the curve of the U-shaped pockets.

18. The system of claim 16 wherein the U-shaped pockets are depressions created by removing material on the inside of the U-shaped pockets.

19. The system of claim 1 wherein said stator assembly further comprises one or more vertical drainage holes to allow drainage of fluid exiting from the upper bearing gaps.

20. The system of claim 19 wherein said stator assembly further comprises a base plate with a circular trough located beneath the drainage holes and the lower bearing gaps, allowing the fluid exiting both the upper and lower bearing gaps to collect and drain out of a hole in the base plate.

21. The system of claim 1 wherein the rotor top and a rotor bottom bearing surfaces have bearing surfaces that are angled with respect to the rotor plate upper and lower surfaces.

22. The system of claim 1 wherein the bearing surfaces of the stator further comprise hydrostatic bearing pockets formed thereon.

23. The system of claim 1 wherein the bearing surfaces and the rotor plate are surfaces of revolution.

24. The system of claim 1 wherein the bearing surfaces and rotor plate are planar.

25. The system of claim 1 wherein the pressurized fluid is hydrocarbon-based.

26. The system of claim 1 wherein the pressurized fluid is water-based.

27. The system of claim 1 wherein the pressurized fluid is a gas.

28. A spindle or rotary table comprising the hydrostatic bearing system of claim 1.

29. The system of claim 1 wherein the upper bearing gaps, the lower bearing gaps, the lower restricting gaps and the upper restricting gaps are sized in the range of about 3 micrometers to about 100 micrometers.

30. The system of claim 1 further comprising alignment pins to align the rotor assembly and the stator assembly.

31. The system of claim 1 further comprising shoulders to align the rotor assembly and the stator assembly.

32. The system of claim 1 wherein the rotor plate is made as a part of the stator assembly.

33. A compact surface linear self-compensated hydrostatic bearing system comprising:
  a rail assembly including a rail top and a rail bottom each having bearing surfaces angled with respect to an axis of rotation of the rotor assembly;
  a carriage bearing assembly including a carriage bearing plate having an upper fluid restricting face and a lower fluid restricting face, a carriage bearing top and a carriage bearing bottom attached to one another and housing at least a portion of the rail assembly therebetween, the carriage bearing top having a bearing surface facing and spaced apart from the rotor top bearing surface forming upper bearing gaps therebetween; and the carriage bearing bottom having a bearing surface facing and spaced apart from the rail bottom bearing surface forming lower bearing gaps there between,
  the carriage bearing top further including a lower fluid restricting surface facing and spaced apart from the rail upper fluid restricting face forming upper restricting gaps therebetween, and the carriage bearing bottom further including an upper fluid restricting surface facing and spaced apart from the rail lower fluid restricting face forming lower restricting gaps therebetween; and
  a fluid supply system configured to supply pressurized fluid to the bearing gaps and into the upper and lower fluid restricting gaps.

34. The system of claim 33 wherein the bearing surfaces of the stator further comprise hydrostatic bearing pockets formed thereon.

35. A method for providing compact surface self-compensation in a hydrostatic bearing system comprising the step of:
  introducing a pressurized fluid to flowpaths formed between concentrically mated rotor and stator assemblies;
  wherein said flowpaths include:
    upper and lower bearing gaps formed between rotor top and bottom bearing surfaces which are angled with respect to an axis of rotation of the rotor assembly, and corresponding bearing surfaces of a stator top and a stator bottom of the stator assembly respectively; and,
    upper and lower restricting gaps formed between rotor upper and lower fluid restricting surfaces and corresponding stator top and bottom lower and upper restricting surfaces, respectively;
  whereby in response to displacement of the rotor assembly from an original position relative to the stator assembly, the pressurized fluid flowing through the flowpaths imparts pressure feedback to restore the rotor assembly to substantially the original position.

* * * * *